META-CYCLIC COMMAND GENERATOR

Filed July 15, 1966

META-CYCLIC COMMAND GENERATOR

INVENTOR
TONY N. CRISCIMAGNA

BY John B Frisone

ATTORNEY

United States Patent Office 3,445,817
Patented May 20, 1969

3,445,817

META-CYCLIC COMMAND GENERATOR

Tony N. Criscimagna, Woodstock, N.Y., assignor to International Business Machines Corporation, Armonk, N.Y., a corporation of New York Filed July 15, 1966, Ser. No. 565,604
Int. Cl. G11b *13/00*
U.S. Cl. 340—172.5 6 Claims

ABSTRACT OF THE DISCLOSURE

A command generator or clock which changes its operation to suit different sets of operating parameters is disclosed. Each of a plurality of selectively interconnected bistable circuits may control one or more unique machine functions. These circuits are periodically strobed to initiate the ordered function or functions. Bistable circuits of a second group are responsive to predetermined operational conditions of the controlled machine and to selected first bistable circuits and are utilized to further define the functions of selected first bistable circuits. A third group of bistable circuits, also responsive to operational conditions of the controlled machine and to predetermined first bistable circuits, are provided for selectively changing the subsequent command sequence.

Figures 1, 1B:
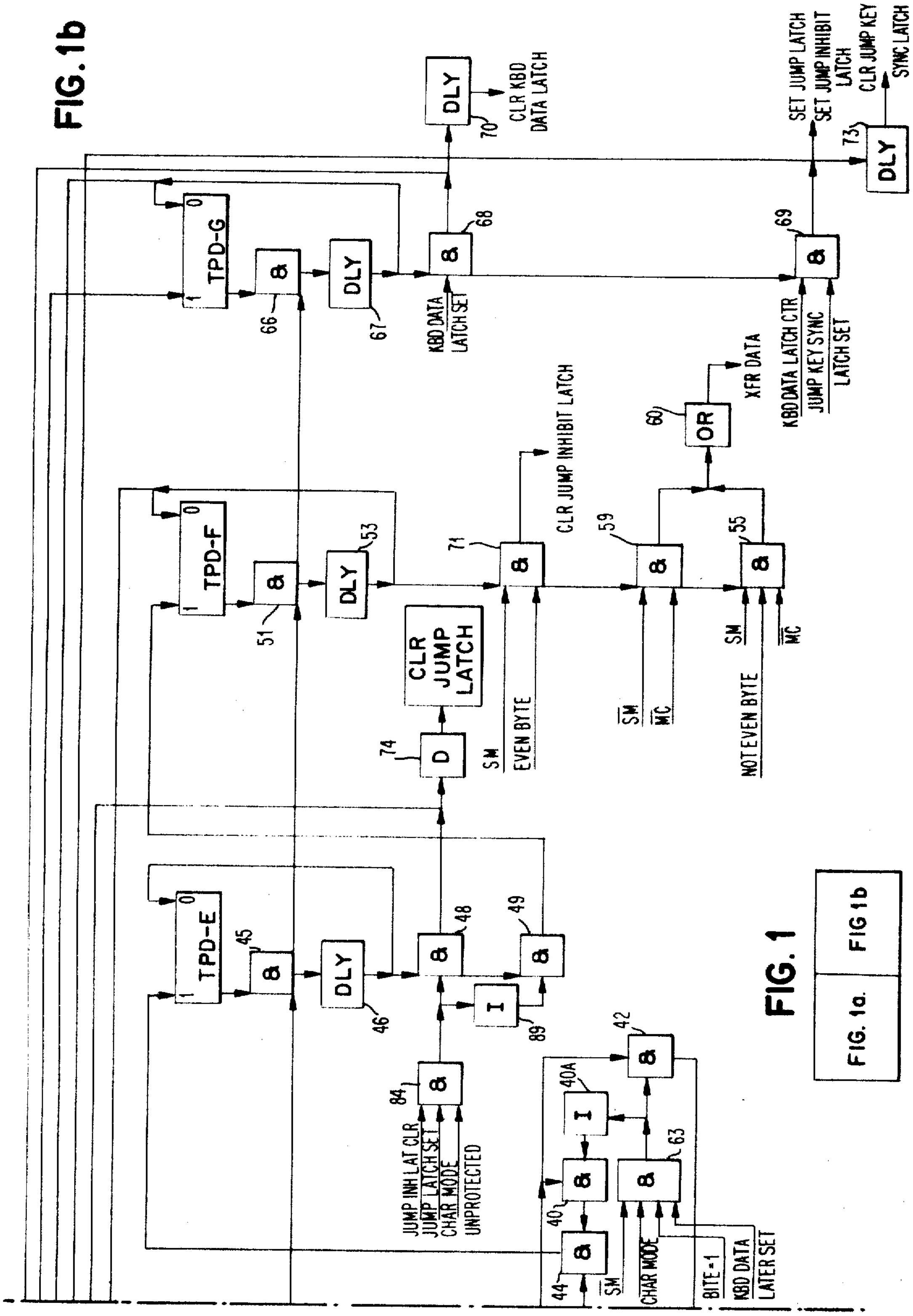

This invention relates to command generators or clocks and more particularly to a meta-cyclic command generator which may take one of many forms to suit one or more particular sets of operating parameters.

Command generators or clocks are utilized to control machine operations which may be composed of sequences and subsequencies in which multiple branching within a sequence is provided upon the occurrence of one or more conditions. Generators or clocks of this type are complex in nature and thus costly to build. In addition they may require a substantial duplication of parts and involve a somewhat longer operation time than the meta-cyclic command generator hereinafter disclosed.

The meta-cyclic command generator according to the subject invention has been configured, for illustration purposes only, to be functionally equivalent to the control clock disclosed in application Ser. No. 557,049, filed June 13, 1966, by Tony N. Criscimagna and assigned to the same assignee as this application. A brief comparison of the two devices reveals a dramatic reduction in the cost of the meta-cyclic command generator over the functionally equivalent clock disclosed in application Ser. No. 557,049. For example, the meta-cyclic command generator utilizes seven triggers and six latches to perform the equivalent functions of the 22 triggers in the conventional clock shown in the said application No. 557,049. It utilizes ten delay circuits instead of 22 and a comparable or slightly greater number of logic circuits such as AND's and OR's. These, however, are far less costly than the trigger and delay circuits which have been eliminated.

One object of the invention is to provide a command generator utilizing a unique decisional memory element for performing the same function in any number of sequences and subsequences.

Another object of the invention is to provide a meta-cyclic command generator utilizing a memory element for effecting branching to a designated routine or subroutine on a subsequent cycle of generator operation.

A further object of the invention is to provide a meta-cyclic command generator utilizing one or more memory elements for further defining the function of the decisional memory elements set forth above on a subsequent routine or subroutine.

The invention contemplates a meta-cyclic command generator comprising, a plurality of first bi-stable means each providing command control of at least one unique function, means for periodically strobing said bi-stable means to sample their state and initiate the assigned function, a plurality of second bi-stable means for further defining one or more of the functions of selected first bistable means when set to one pre-selected state, a plurality of third bi-stable means responsive to conditions imposed by an operating system external of the generator for determining branching conditions on the next subsequent sequence of operation, and circuit means interconnecting said first, second and third bi-stable means and responsive thereto and to external operational conditions whereby said meta-cyclic command generator will assume a functional configuration at any given time determined by the states of said first, second and third plurality of bistable means and said external operational conditions.

The foregoing and other objects, features and advantages of the invention will be apparent from the following more particular description of a preferred embodiment of the invention as illustrated in the accompanying drawings.

Figure 1A:
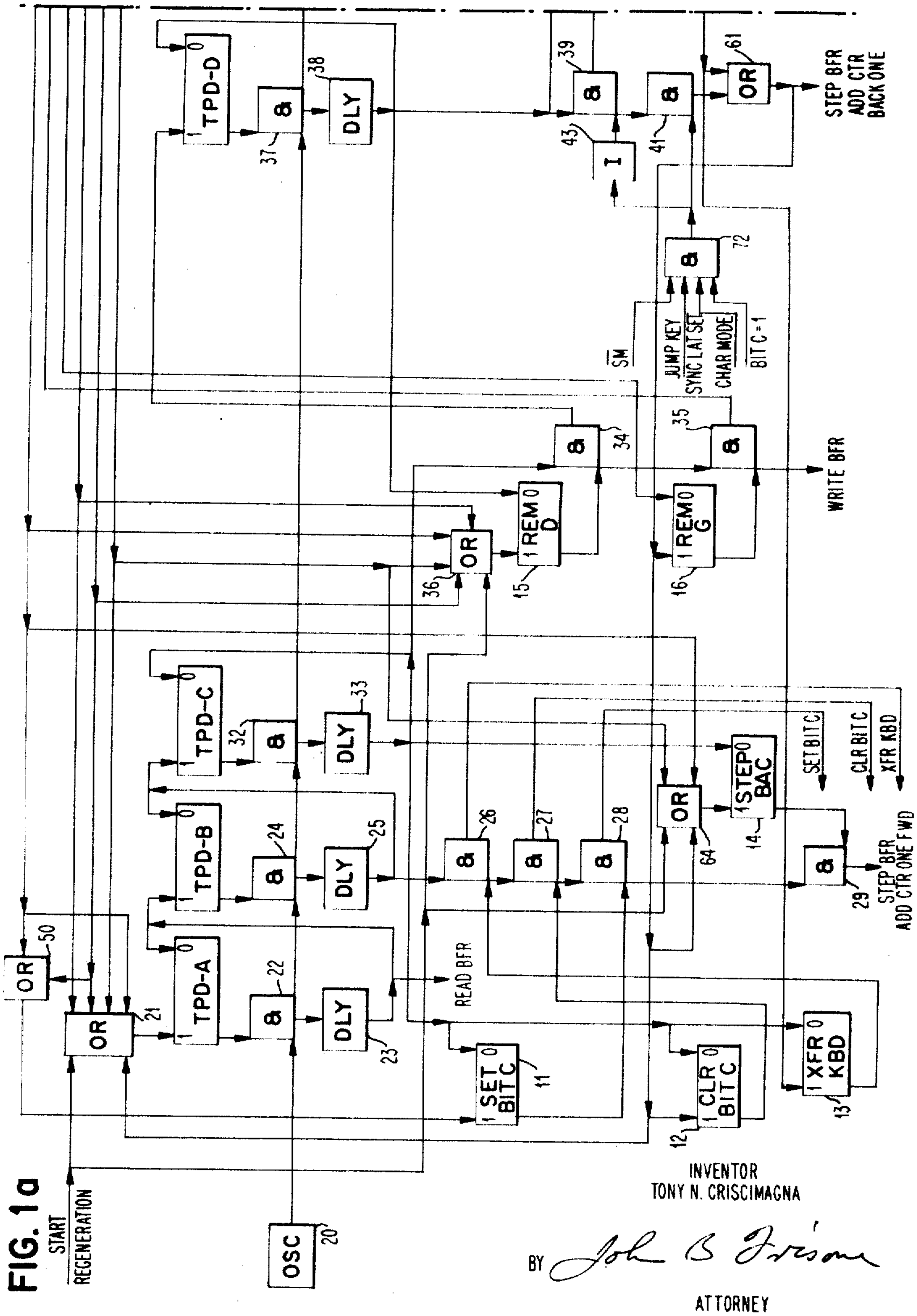

FIGURE 1 shows the relationship of FIGURES 1*a* and 1*b* which together form a schematic diagram of a novel meta-cyclic command generator constructed according to the invention.

The meta-cyclic command generator according to the invention employs seven triggers labeled TPD A, B, C, D, E, F and G respectively. Each of these triggers performs a function during the operation of the device. The particular function performed by a trigger is determined by the trigger itself and by external operating conditions. In addition, a plurality of latches 11, 12, 13 and 14 determine the functions performed by various triggers. Two additional latches 15 and 16 are utilized for determining the operational sequences during a subsequent cycle of generator operation.

As previously stated the meta-cyclic command generator has been arranged, for illustration purposes only, to perform the same functions performed by the clock disclosed in application Ser. No. 557,049 previously mentioned. The description will in general follow the description of the operation of the device shown in the said application. Thus, the first set of operating conditions will consider a case of straight regeneration where there is neither a keyboard entry by the operator or a jump function. The second set of operating conditions will consider regeneration of an image with a keyboard data entry. The third set will consider regeneration with a jump function performed. These three sets of operating conditions will be described by describing the sequence of events which occur during their execution. At the same time as structural elements become operative their function in the circuit will be identified and made clear.

A start regeneration signal supplied by AND gate 52 in the aforementioned Patent application is applied to an OR circuit 21 and the output of OR circuit 21 sets the TPD A trigger which enables an AND gate 22. An oscillator 20 strobes AND gate 22 developing an output which is passed through a delay circuit 23. The output of delay circuit 23 is applied to the external circuts shown in the aforementioned Patent application Ser. No. 557,049 to read the buffer and transfer the buffer address counter to the buffer address register. In addition, the output of delay circuit 23 resets the TPD A trigger and sets the TPD B trigger. It should be apparent from this that TPD B must always follows TPD A and invariably will since there are no intervening decisional branches at this point in the sequence of events, thus, once clock action is instituted by a TPD A this must always be followed by a TPD B from the TPD B trigger. When the TPD B trigger is set it enables an AND circuit 24 which is again strobed on a subsequent oscillator cycle from oscillator 20 to develop a TPD pulse via a delay circuit 25. The output of delay circuit 25 namely TPD B is applied to three AND gates 26, 27 and 28. The other inputs of these AND circuits are connected to the outputs of latches 13, 12 and 11, respectively. However, since these latches were not previously set, the functions indicated by the outputs of AND circuits 26, 27 and 28 are not performed since the gates have not been previously enabled by the latches 13, 12 and 11. These latches will during the course of the description be enabled at a later time and the operation therewith will become more apparent. The TPD B pulse is also applied to an AND gate 29 which will be enabled if latch 14 is set.

The output of AND circuit 29 at this time will step the buffer address counter forward one. The buffer address counter is located in the external circuits. However, we will throughout the course of this operation keep track of the count of the buffer address counter since this count will enter into various phases of operation. Assuming for the moment that the buffer was previously set at an address S it will now be stepped to an address S plus one. Latch 14 was previously set by the output of AND gate 52 or the Start Regeneration signal via OR gate 64.

The output of delay circuit 25 is applied to the reset input of the TPD B trigger and to the set input of TPD C trigger. The one output from the TPD C trigger is applied to enable an AND circuit 32 which provides an output on a subsequent pulse from sócillator 20 and via a delay circuit 33 the TPD C pulse. The TPD C pulse is applied to the reset input of latches 11, 12 and 13. In this instance no function is performed since the latches had not previously been set. However, in subsequent cycles of operation this will not be the case. One or more of these latches may be set and they will at TPD C time be reset. The output of delay circuit 33 is also applied to latch 14 and resets this latch at this time since it had previously been set with the start regeneration signal. The output of delay circuit 33 is applied to the reset input of the TPD C trigger and resets the trigger. At this point in the operation namely at TPD C branching may take place. For this purpose the output of delay circuit 33 is applied to a pair of AND circuits 34 and 35. AND circuit 34 has its other input connected to the latch 15 which in the current cycle of operation has been set by the start regeneration signal which was applied to the set input of latch 15 via an OR circuit 36. Thus an output is developed at AND circuit 34 which sets the TPD D trigger. During TPD C the write buffer cycle was completed in the external circuits.

The TPD D trigger when set enables an AND circuit 37 which is trobed by oscillator 20 and an output applied to a delay circuit 38. The output of delay circuit 38 is the TPD D pulse. This pulse is applied to reset the TPD D trigger. In addition, branching and functions may be executed during TPD D. The output of delay circuit 38 is applied to an AND gate 39, an AND gate 40, an AND gate 41 and an AND gate 42. AND gates 39 and 41 are responsive to external conditions which are applied to an AND circuit 72. AND circuit 72 is similar to AND circuit 72 shown in the aforementioned patent application. This circuit will provide an output when the code being read from the buffer is not an SM code; when the jump key sync latch is set; when the code is a character mode code and when bit C (the cursor bit) in the output register is a one. However, if these conditions are not present an inverter 43 enables AND circuit 39 and the output of AND circuit 39 is applied via an AND circuit 44 to set the TPD E trigger which is the case in this instance. The other input of AND gate 44 is enabled by an AND gate 63, inverter 40A and AND gate 40. AND gate 63 like gate 72 provides an output for enabling AND gate 42, which is not the case in straight regeneration, when the code in the output register is not SM; the keyboard data latch is set; a character mode operation is in progress and bit C of the output register is "one." These conditions will only occur during a keyboard entry and will be described later in connection with such a function. However AND gate 40 is enabled at this time and causes the TPD E trigger to be set via AND circuit 44. This connection is necessary to prevent double branching i.e., in the event of a jump or keyboard entry. The necessity for this arrangement will become apparent when these functions are described later. The TPD E pulse always follows the TPD D pulse in à straight regeneration sequence without keyboard entry or cursor jump. The one output of the TPD E trigger is applied to enable an AND circuit 45 which is again strobed by a subsequent oscillator pulse from oscillator 20 and applied to a delay circuit 46 to generate the TPD E pulse. This pulse is applied to the reset input of the TPD E trigger and to a pair of AND gates 48 and 49.

An AND gate 84 and an inverter 89 control AND gates 48 and 49. Thus if the output of AND circuit 84 is up the TPD E pulse via AND circuit 48 is applied to the OR circuit 21 to set the TPD A trigger and via another OR circuit 50 to set the latch 11 so that bit C will be set on the next subsequent cycle. However, this is not the case here. AND circuit 84 and inverter circuit 89 are functionally identical to the AND circuits 84 and inverter 89 shown in the aforementioned patent application Ser. No. 557,049. Here AND circuit 84 will not provide an output at this time since the jump latch is not set and AND gate 49 will be enabled via inverter 89. Thus the TPD E pulse will be applied to the set input of the TPD F trigger. The one output of the TPD F trigger enables an AND circuit 51 the output of which is developed when oscillator 20 strobes the circuit. The output from AND circuit 51 is applied to a delay circuit 53 and the delayed output is fed back to the reset input of the TPD F trigger and via OR circuit 21 to the set input of the TPD A trigger. However, in addition, the TPD F pulse examines certain external conditions and will perform selected functions if certain conditions are present.

The TPD F pulse is applied to AND circuit 71 which is similar to the AND circuit 71 shown in the aforementioned application and develops an output which will clear the jump inhibit latch along with other functions if the output register contains an SM code and the buffer address is even. Another AND gate 59 is enabled by the not SM code detected from the output register in the aforementioned application and the mode code search latch clear output. If this gate is properly conditioned the TPD F pulse is applied via an OR circuit 60 to transfer data to the data flow registers and this function is described in the aforementioned application Ser. No. 557,049. Another AND gate 55, which is functionally identical to gate 55 disclosed in the aforementioned application, will be enabled when the SM code is present in the output register; it is not an even byte; and the mode code search latch is clear. The output of this gate is applied through OR circuit 60 and also causes transfer of data to the data flow registers. The illustrative external functions described above as well as others, not described, are not directly germane to the generator operation. However, some of these will effect the operation but only isofar as they effect AND circuits 84, 63 and 72 previously described and other AND circuits which will be described later in the course of the description. As previously stated, this particular configuration of the command generator was designed to perform the same functions performed by the clock shown in the said application Ser. No. 577,049 in order to illustrate the dramatic improvement over such a conventional clock. It does, however, have a general application as a replacement for any other conventional clock or command generator system utilized in many other devices.

The cycle just described will continue on a repetitive basis provided no keyboard entry is attempted by the operator nor a jump function attempted by the operator. Thus TPD A will be followed by TPD B. On subsequent TPD B's the functions: set bit C, clear bit C or transfer keyboard data will not be performed since we are considering straight regeneration and there is no keyboard data nor is a cursor operation involved. Thus TPD B will step the buffer address counter to the next address and the following TPD C will cause the writing of the buffer address which was previously read on TPD A and TPD D will of course ensue since the remember D latch 15 had been set by the previous TPD F. The last occurring TPD F was in addition to being applied to OR circuit 21 to set TPD A trigger also applied via OR circuit 36 to set the remembered D latch 15. The remember D latch on the subsequent sequence sets the TPD D latch via the AND circuit 34, as previously described, to again go on with the sequence with TPD E and TPD F. Each TPD F which follows sets the TPD A trigger and the remember D latch 15. It should be obvious that the sequence will continue until some operator intervention occurs. The next sequence to be described is regeneration with a keyboard entry. In this case the operator will attempt to enter data into the memory via the keyboard as a substitute for data which is already in a given address.

The command generator during the regeneration cycle with a keyboard entry functionally reproduces the R to L to R sequence described in the aforementioned patent application Ser. No. 557,049. It will be assumed for the purposes of description that the sequence about to be described occurs after a single sequence above. Thus the buffer address counter contains the address $S+1$. It was stated previously that the address S was the first address to be read and this was incremented as stated above to the $S+1$ value. Thus with the occurrence of the next TPD A the same functions described above are performed again. However, at this time, address $S+1$ is read out of the buffer. The TPD B follows as described above and performs the same functions. Here as previously stated latches 11, 12 and 13 are reset thus the function performed via the outputs of AND circuits 26, 27 and 28 are not performed in this instance since none of the said circuits were previously enabled. The buffer address counter however is, during TPD B, stepped to $S+2$ and TPD C ensues. During TPD C latch 14 is reset and the buffer is rewritten with the contents of the register as shown in the aforesaid patent application No. 557,049. The remember D latch 15, as stated previously, had been set. Thus, the next sequence or the next TPD pulse is TPD D. At this time, however, since a keyboard data entry is being described AND gate 63 enables AND gate 42. AND gate 63 provides an output which will enable AND gate 42 since the code in the output register is not SM, the keyboard data latch has been set, the device is in character mode and bit C in the output register is equal to one. We assume at this time that bit C must be equal to one since a keyboard entry as described in the said application can only occur in that position at which the cursor bit resides. Thus, the output of delay circuit 38 passes through the enabled AND gate 42 to set latch 13 and is applied through OR circuit 61 to step the buffer address counter back one from $S+2$ to $S+1$. The output of AND circuit 42 via OR 61 is also applied through an OR circuit 64 to set latch 14 and to set latches 16 and 12 and through OR circuit 21 to bring forth another TPD A pulse. This shortens the sequence which started out as the prior sequence described and will now repeat with the TPD A pulse. However, on the next ensuing sequence since latch 16 has been set TPD G will follow TPD C. How this will effect this subsequent cycle of operation will become clear as the description continues. The TPD A which results from the output developed at OR circuit 42 is identical to the one set forth above since even the address $S+1$ is being read. The ensuing TPD B pulse again is the same as above. However, this time the latch 13 which has been previously set by the output of AND circuit 42, causes the data from the keyboard to be inserted in the output register of the buffer unit. At the same time latch 12 enables AND circuit 27 and causes the cursor bit position of the output register to be cleared. Thus, functionally at TPD B the data contained in the keyboard is inserted in the register and the cursor bit is cleared from the cursor bit position. Also during TPD B the buffer address counter is stepped to $S+2$ to be prepared for a subsequent cycle of operation. A TPD C follows the TPD B and clears latches 11, 12, 13 and 14 and writes the buffer. Thus, the keyboard data which was inserted in the output register at TPD B is now inserted in the buffer at the $S+1$ address.

The remember G latch which was previously set on the prior TPD D is up and enables AND gate 35 and the TPD C pulse via AND gate 35 sets the TPD G trigger to produce a TPD G pulse following this TDP C pulse. The one output of the TPD G trigger is applied to an AND gate 66 which is strobed by a subsequent oscillator pulse from oscillator 20 and applied through a delay circuit 67 to reset the TPD G trigger and the latch 16. In addition the output of delay circuit 67 is applied to a pair of AND gates 68 and 69. AND gate 68 is enabled by the keyboard data latch being set and AND gate 69 will be enabled if the keyboard data latch is clear and the jump key sync latch is set. These signal sources are all illustrated and described in the said copending application Ser. No. 557,049. The signal conditions utilized in the specific embodiment being described are unique to the application. However, each application of the metacyclic command generator will have a different set of unique conditions dependent on the particular application. In this particular instance the keyboard data latch had previously been set thus AND circuit 68 provides an output which is fed back to set the step back latch 14, set the remember D latch 15 via OR circuit 36, set the TPD A trigger by a OR circuit 21, and via OR circuit 50 set the set bit C latch 11. Thus, on the next subsequent sequence bit C will be set, remember D will transfer to TPD D following TPD C and the buffer address counter will be stepped. In addition, the output of AND circuit 68 is applied via a delay circuit 70 to clear the keyboard data latch since the function required namely the entry of keyboard data has been completed.

The ensuing TPD A is identical to the TPD A pulses described above and reads the contents of the buffer at address $S+2$. The ensuing TPD B again is the same as the TPD B pulse described above and it sets bit C since the latch 11 has been set thus enabling AND gate 28. In addition during TPD B the buffer address counter is stepped one forward to address $S+3$. The ensuring TPD C pulse resets the latches 11, 12, 13 and 14 as previously described and causes the contents in the output register to be written in address $S+2$. Since the remember D latch 15 had been previously set by the output of AND circuit 68 the TPD D trigger is set and the step back latch 14 is reset. The ensuing TPD D is the same as described in step four of the first sequence and this is following by a TPD E which is the same as described for the regeneration sequence and the TPD F follows as above for the regeneration sequence. This completes the description of a keyboard entry. As is obvious from following the clock cycles or the generation cycles the data accompanying the cursor in the buffer of the display unit has been replaced by the data inserted via the keyboard. In addition the cursor has been moved to the next subsequent address. At this point regeneration as described in the first sequence above would normally continue unless the operator desires to enter additional data or unless he desires to jump the cursor.

The following description will describe how the jump cursor function is performed and controlled by the novel generator. We will assume that the cursor bit resides in address $S+2$ thus at the time that the address $S+2$ is read on a subsequent TPD A a TPD B will follow. Here the buffer address counter will be stepped forward to $S+3$ and on the next TPD C the contents of the register will be written back into $S+2$. We must remember at this point that this includes a cursor bit and at this time the step buffer address counter latch 14 will be reset. The ensuing TPD D will reset the remember D latch 15 at this time AND circuit 72 will enable AND circuit 41 applying the output of AND circuit 41 via OR circuit 61 to step the buffer address counter back one from $S+3$ to $S+2$. In addition the output of OR circuit 61 will set the step buffer address counter latch 14 via OR circuit 64, set the remember G latch 16, set the clear bit C latch 12 and initiate a TPD A via OR circuit 21. The following TPD A caused by the output of OR circuit 61 reads buffer address $S+2$. This is the address which contains the cursor. The following TPD B is identical to the prior described TPD B's however at this time bit C is cleared in the register since latch 12 has been previously set and enables AND gate 27. The buffer address counter is stepped one forward at this point to $S+3$. Since the remember G latch had been previously set a TPD G pulse immediately follows the TDP C pulse. This TPD G pulse sets the jump latch and the jump inhibit latch since the keyboard data latch has been cleared and the jump key sync latch has been set, by definition this occurs during a jump sequence, and the output of delay circuit 67 via AND gate 69 performs these functions. In addition the output of AND gate 69 clears the jump key sync latch after a delay via a delay circuit 73. The output of AND circuit 69 is applied to A trigger. In addition the output of AND circuit 69 via OR circuit 21 and requests a TPD A by setting the TPD-OR circuit 36 sets the remember D latch 15 so that on the ensuing cycle the generator will step from TPD C to TPD D. The subsequent TPD A caused by the output of AND circuit 69 is the same as described above however it reads address $S+3$ and the following TPD B again is the same as above. Here however bit C must be set if certain conditions occur. Bit C will not be set until a subsequent TPD F decodes the appropriate mode code and clears the jump inhibit latch as set forth in the said copending application Ser. No. 557,049. A number of sequences as described above will undoubtedly intervene during which image regeneration takes place. However before the subsequent cycles are completed the buffer address counter is stepped to $S+4$.

Assuming for the moment that X addresses are read before appropriate conditions exist namely, the appropriate mode code on a subsequent TPD E at address $S+4+X$. Then on the subsequent TPD A address $S+5+X$ will be read. This address, as set forth in the said patent application Ser. No. 557,049, will be the first address following a character mode code which defines an unprotected character data field. TPD E address $S+4+X$ finds AND gate 84 enabled since the jump inhibit latch has been cleared by a previous TPD F, the jump latch has been previously set, a character mode and unprotected fields code is in address $S+4+X$. Thus, via AND circuit 84 the jump latch will be cleared after a delay introduced by delay 74 and a TPD A will be called for via OR circuit 21. In addition the output of AND gate 48 will be applied via OR circuit 36 to set remember D latch 15. The output of AND gate 48 is also applied via OR circuit 50 to set latch 11. Thus, on the ensuing TPD A the address $S+5+X$ is read and on the next TPD B bit C is set, the buffer address counter is stepped forward one to $S+6+X$, and the contents of the register are written into buffer address $S+5+X$. At this point the cursor bit has been positioned in the first data position of the next unprotected character field. A TPD C follows the TPD B. This is identical to the TPD C previously described. TPD C is followed in order by TPD D, TPD E and TPD F. At this point regeneration will continue as described in the very first instance until either another keyboard entry or jump operation is initiated by the operator which will follow the pattern set forth above. The last sequence described namely the jump sequence according to the meta-cyclic command generator requires a minimum of eighteen steps for handling the process of moving the cursor from its existing position into the next succeeding data field namely a data field which defines unprotected characters. The eighteen steps do not include the intervening steps required to read the buffer for data which intervenes between the address at which the cursor was found and the address into which the cursor is moved.

According to the clock system disclosed in the aforesaid application Ser. No. 557,049, this same process would require 20 command steps or cycles of operation. Here again the 20 steps are computed based on the same assumption made above namely that those steps required to provide buffer cycles for moving over data are not included. Each of the other cycles described above namely ordinary regeneration cycle and the keyboard entry cycle require the same number of command steps. With the novel command generator described certain functions will undoubtedly result in fewer steps. This will depend upon certain operating conditions of the system within which the generator is utilized. However, in no instance would more steps be required and there is a potential for time savings available in those instances where steps can be eliminated.

While the invention has been particularly shown and described with reference to a preferred embodiment thereof, it will be understood by those skilled in the art that various changes in form and detail may be made therein without departing from the spirit and scope of the invention.

What is claimed is:

1. A meta-cyclic command generator comprising, a plurality of first bistable means each providing command control of at least one unique function which may be required in at least one operating sequence of a machine controlled by the generator, means for periodically sampling said first bistable means to initiate the unique function assigned to any first bistable means in a predetermined bistable state, and a plurality of second bistable means each responsive to predetermined conditions imposed by the external operation of the controlled machine and to predetermined first bistable means for determining variably the next subsequent command sequence.

2. A meta-cyclic command generator comprising, a plurality of first bistable means each providing command control of at least one unique function which may be required in at least one operating sequence of a machine controlled by the generator, means for periodically sampling said first bistable means to initiate the unique function assigned to any first bistable means in a predetermined bistable state, and conditional branch circuit means interconnecting said first bistable means and responsive to conditions imposed by the operation of the controlled machine for determining the order of commands during the current sequence.

3. A meta-cyclic command generator comprising, a plurality of first bistable means each providing command control of at least one unique function which may be required in at least one operating sequence of a machine controlled by the generator, means for periodically sampling said first bistable means to initiate the unique function assigned to any first bistable means in a predetermined bistable state, conditional branch circuit means interconnecting said first bistable means and responsive to conditions imposed by the operation of the controlled machine for determining the order of commands during the current sequence, and a plurality of second bistable means each responsive to predetermined conditions imposed by the operation of the controlled machine and to predetermined first bistable means for determining the next subsequent command sequence.

4. A meta-cyclic command generator comprising, a plurality of first bistable means each providing command control of at least one unique function which may be required in at least one operating sequence of a machine controlled by the generator, means for periodically sampling said first bistable means to initiate the unique function assigned to any first bistable means in a predetermined bistable state, a plurality of second bistable means each responsive to predetermined conditions imposed by the operation of the controlled machine and to predetermined first bistable means for defining a change of function of selected first bistable means on the next subsequent command sequence, and conditional branch circuit means interconnecting said first bistable means and responsive to selected conditions imposed by the operation of the controlled machine for determining the order of commands during the current sequence.

5. A meta-cyclic command generator comprising, a plurality of first bistable means each providing command control of at least one unique function which may be required in at least one operating sequence of a machine controlled by the generator, means for peroiodically sampling said first bistable means to initiate the unique functions assigned to any first bistable means in a predetermined bistable state, a plurality of second bistable means each responsive to predetermined conditions imposed by the operation of the controlled machine and to predetermined first bistable means for defining a change of function of selected first bistable means on the next subsequent command sequence and a plurality of third bistable means each responsive to predetermined conditions imposed by the operation of the controlled machine and to predetermined first bistable means for determining the next subsequent command sequence.

6. A meta-cycle command generator comprising, a plurality of first bistable means each providing command control of at least one unique function, means for periodically strobing said bistable means to sample their state and initiate the assigned function, a plurality of second bistable means each responsive to predetermined conditions imposed by the operation of the controlled machine and to predetermined first bistable means for further defining the function of selected first bistable means on the next subsequent command sequence, a plurality of third bistable means responsive to predetermined conditions imposed by the operation of the controlled machine and to predetermined first bistable means for determining the next subsequent command sequence, and circuit means interconnecting said first bistable means and responsive to selected conditions imposed by the operation of the controlled machine for determining the order of commands during the current sequence.

References Cited

UNITED STATES PATENTS

| | | | |
|---|---|---|---|
| 3,353,157 | 11/1967 | Chesarek et al. | 340—472.5 |
| 3,308,437 | 3/1967 | Barbagallo et al. | 340—172.5 |
| 3,283,131 | 11/1966 | Carbrey | 235—164 |
| 3,264,457 | 8/1966 | Seegmiller et al. | 235—150.53 |
| 3,089,125 | 8/1963 | Reynolds | 340—172.5 |
| 3,036,775 | 5/1962 | McDermid et al. | 235—165 |
| 2,926,242 | 2/1960 | Feyzeau | 250—27 |

GARETH D. SHAW, *Primary Examiner.*